(12) United States Patent
Hussain

(10) Patent No.: US 9,011,621 B1
(45) Date of Patent: Apr. 21, 2015

(54) SYSTEMS AND METHODS FOR PRODUCING A BALL

(71) Applicant: Ali Hasnain Hussain, Sialkot (PK)

(72) Inventor: Ali Hasnain Hussain, Sialkot (PK)

(*) Notice: Subject to any disclaimer, the term of this patent is extended or adjusted under 35 U.S.C. 154(b) by 0 days.

(21) Appl. No.: 14/516,457

(22) Filed: Oct. 16, 2014

(51) Int. Cl.
| | | |
|---|---|---|
| *B32B 7/08* | (2006.01) | |
| *A63B 39/00* | (2006.01) | |
| *A63B 41/00* | (2006.01) | |
| *B29C 65/00* | (2006.01) | |
| *B32B 37/00* | (2006.01) | |
| *B32B 38/04* | (2006.01) | |
| *A63B 41/08* | (2006.01) | |
| *F16K 41/00* | (2006.01) | |
| *A63B 41/10* | (2006.01) | |
| *A63B 45/00* | (2006.01) | |
| *B29C 65/48* | (2006.01) | |
| *B29C 65/62* | (2006.01) | |
| *B29C 65/72* | (2006.01) | |

(52) U.S. Cl.
CPC .............. *A63B 41/10* (2013.01); *A63B 45/00* (2013.01); *A63B 41/08* (2013.01); *B29C 65/48* (2013.01); *B29C 65/62* (2013.01); *B29C 65/72* (2013.01); *B29C 66/494* (2013.01)

(58) Field of Classification Search
CPC ........ A63B 41/00; A63B 41/08; A63B 41/10; A63B 2243/0025; B29C 65/00; B29C 65/48; B29C 65/62; B29C 65/72; B29C 66/494; B29C 66/727; B29D 22/02; B29D 22/04; B32B 25/04; B32B 25/14; B32B 2250/42; B32B 37/12; B29L 2022/02; B29L 2031/545
USPC ........... 156/60, 63, 91, 92, 93, 145, 146, 147, 156/182, 196, 212, 213, 216, 228, 250, 256, 156/258, 263, 264, 265, 266, 285, 287, 293, 156/297, 304.1; 473/569, 598, 599, 604, 473/605, 606, 607, 609, 610, 611
See application file for complete search history.

(56) References Cited

U.S. PATENT DOCUMENTS

| | | | | |
|---|---|---|---|---|
| 2009/0325745 | A1* | 12/2009 | Rapaport et al. .............. | 473/604 |
| 2011/0253292 | A1* | 10/2011 | Chen ............................... | 156/93 |

* cited by examiner

*Primary Examiner* — Philip Tucker
*Assistant Examiner* — Brian R Slawski
(74) *Attorney, Agent, or Firm* — Haris Zaheer Bajwa

(57) ABSTRACT

A sports ball having a high-performance cover formed from a plurality of panels with attached foam backing. The panels may be stitched together at stitch lines which are 2-4 mm from the edges of each of the panels. During manufacturing, before compression is applied, foam attached to outer layers for each of the panels may be a distance 2-6 mm away from the stitch lines. Foam attached on the inside of the sports ball may provide support and a robust round shape for manufacturing of a high performance sports ball.

12 Claims, 14 Drawing Sheets

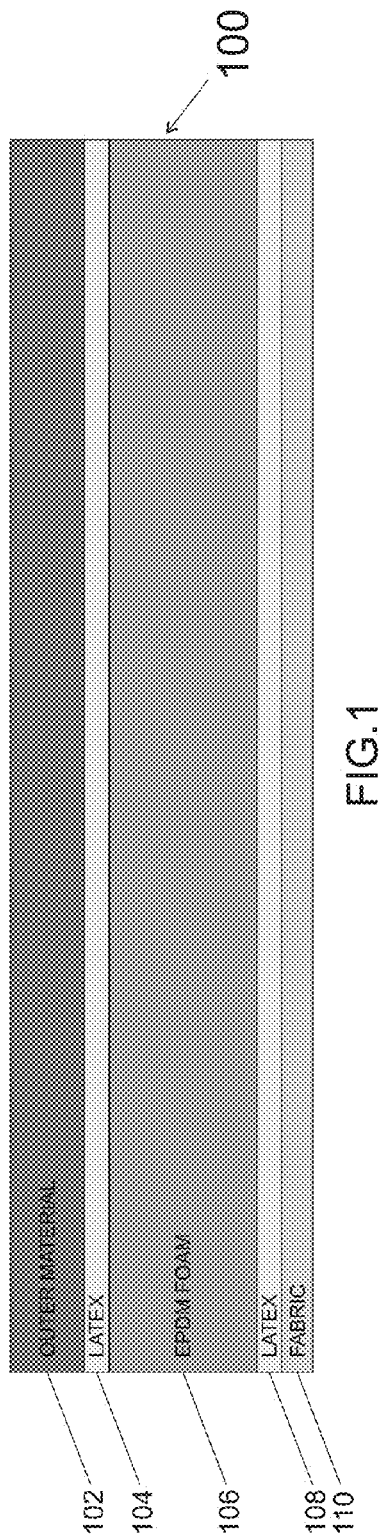
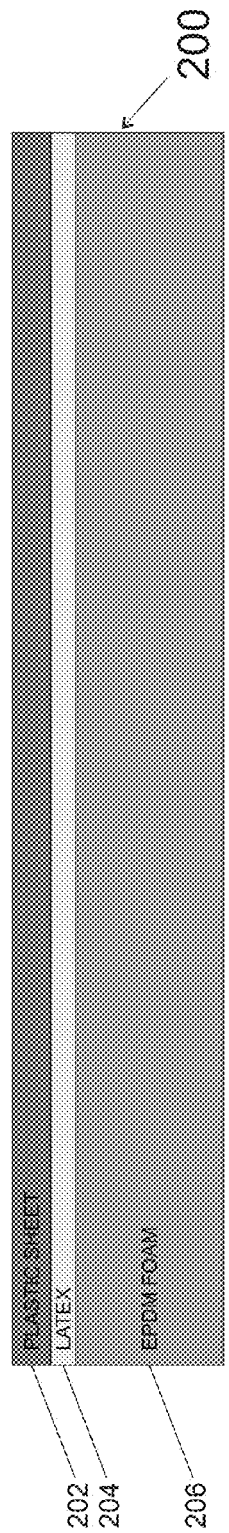

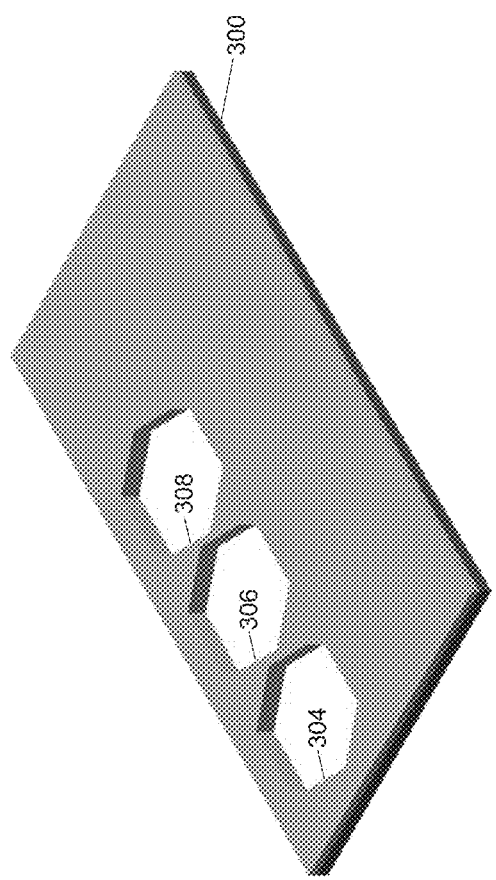
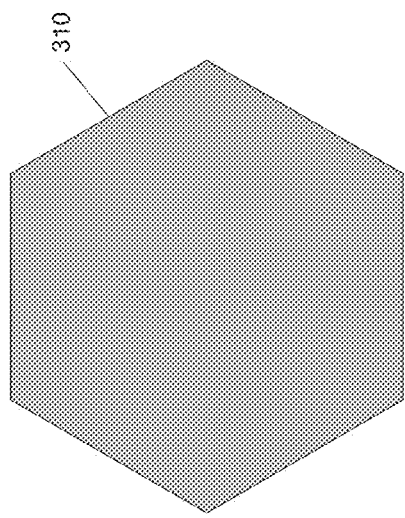
FIG.3A
FIG.3B

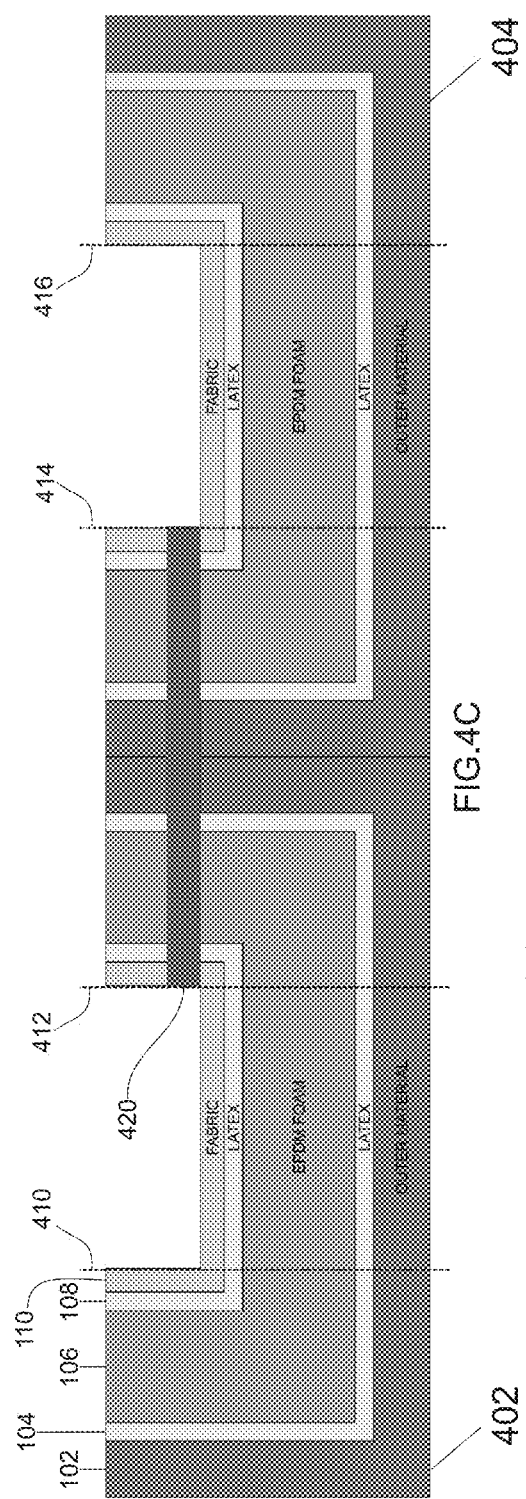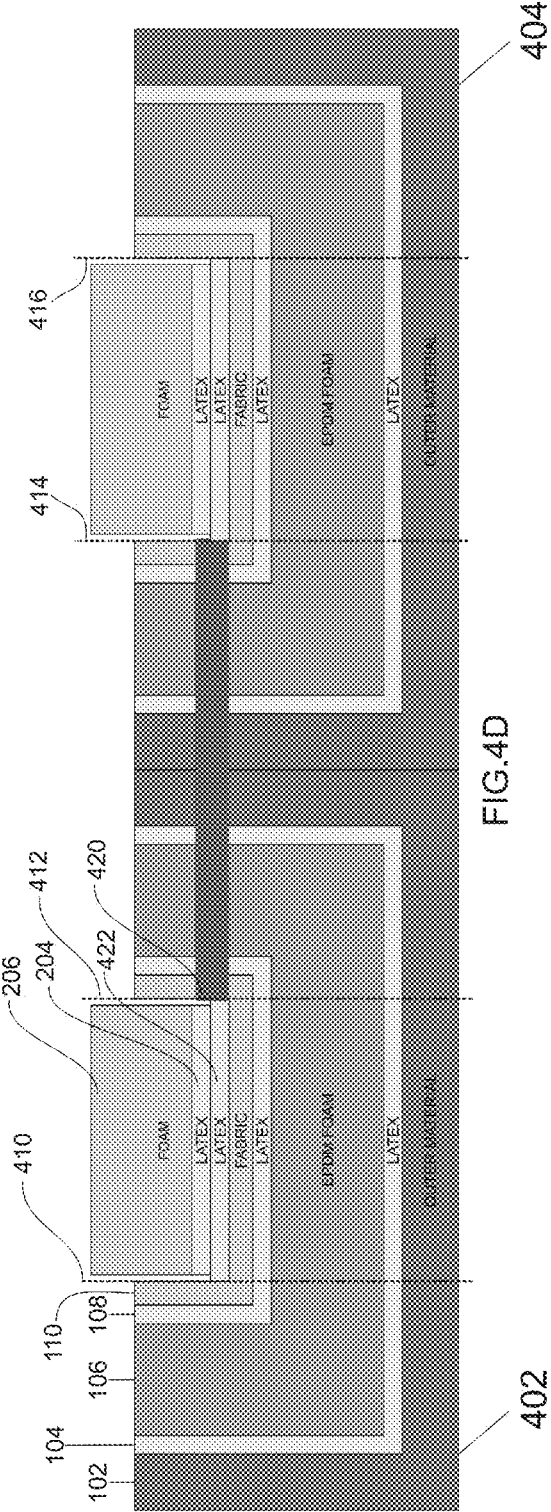

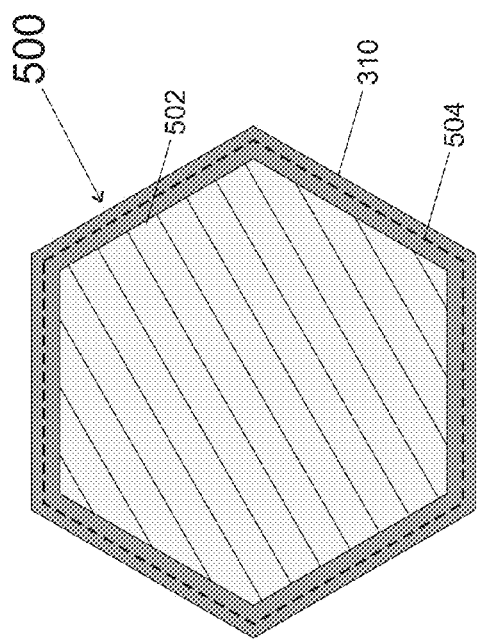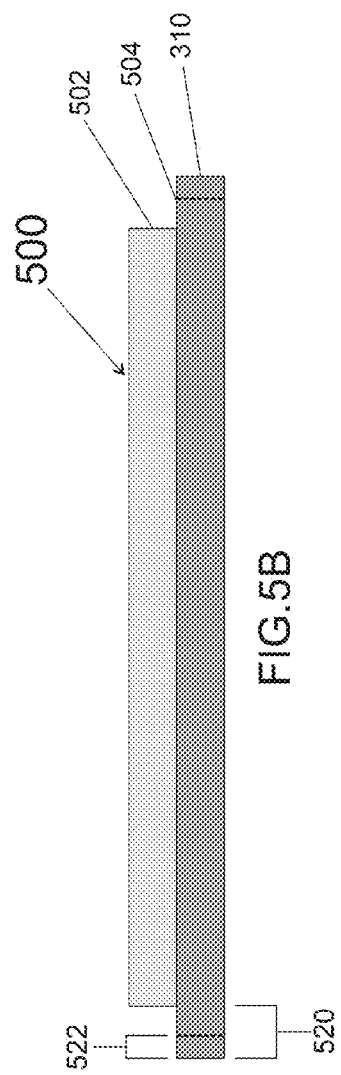
FIG.5A
FIG.5B

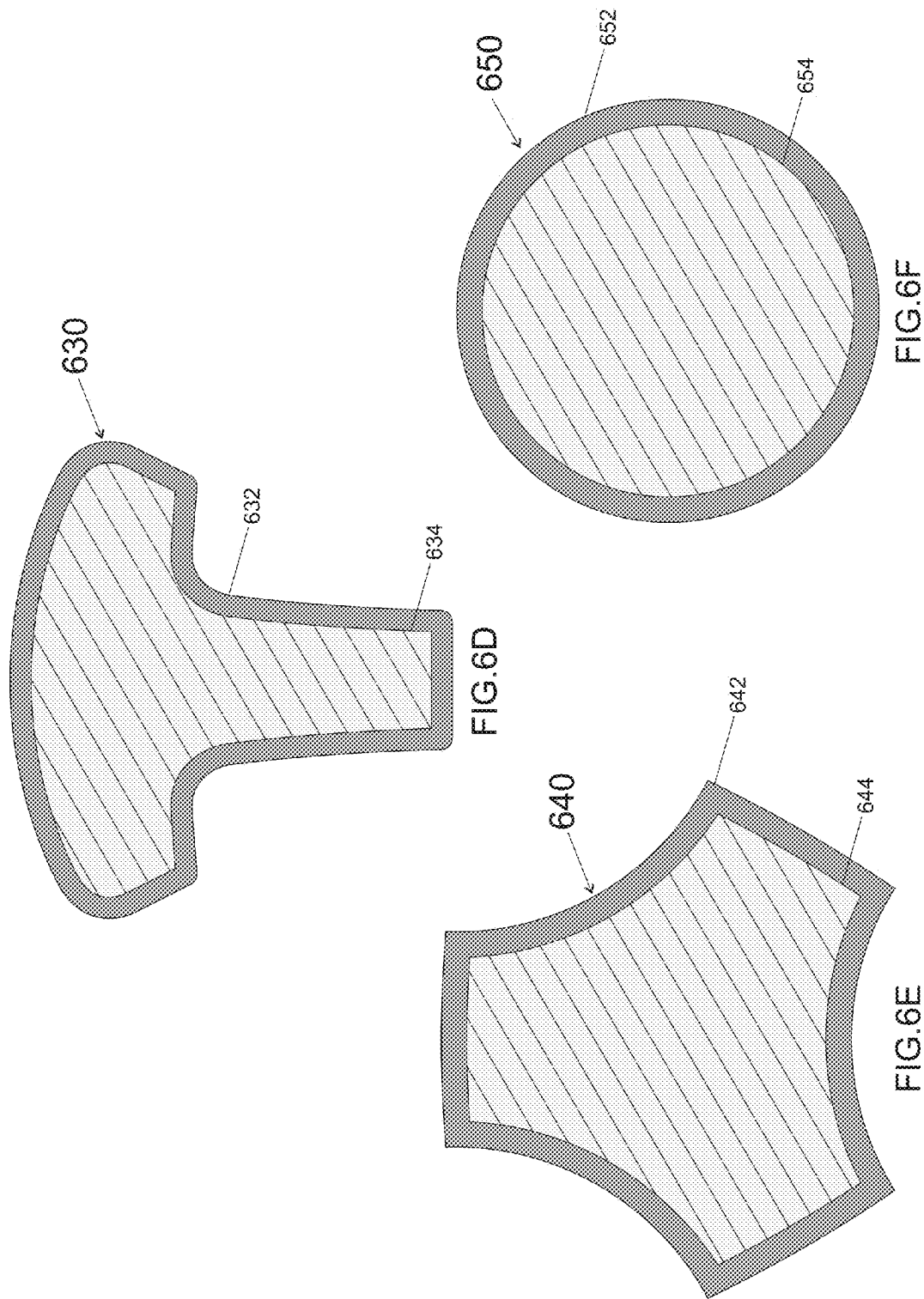

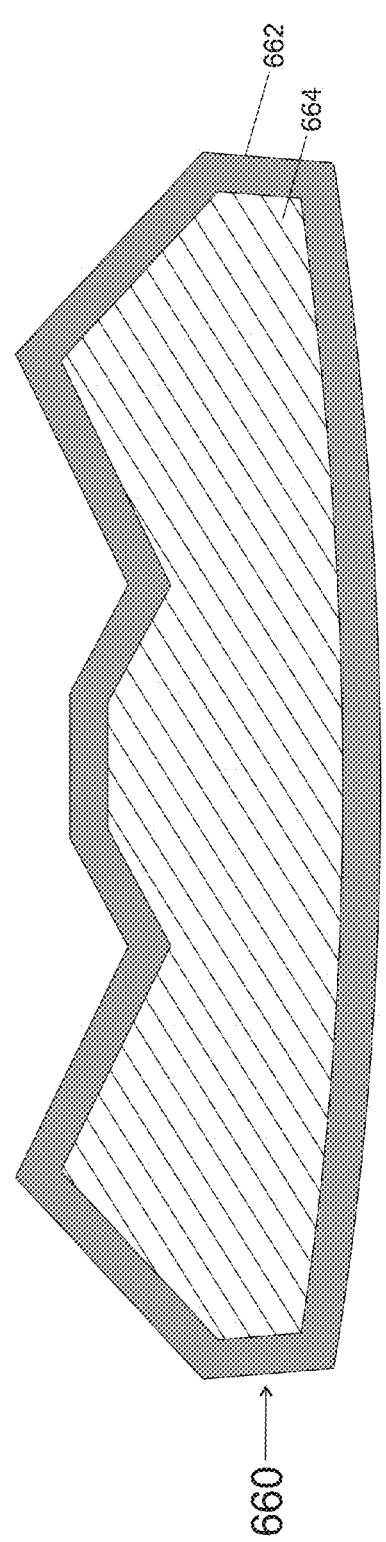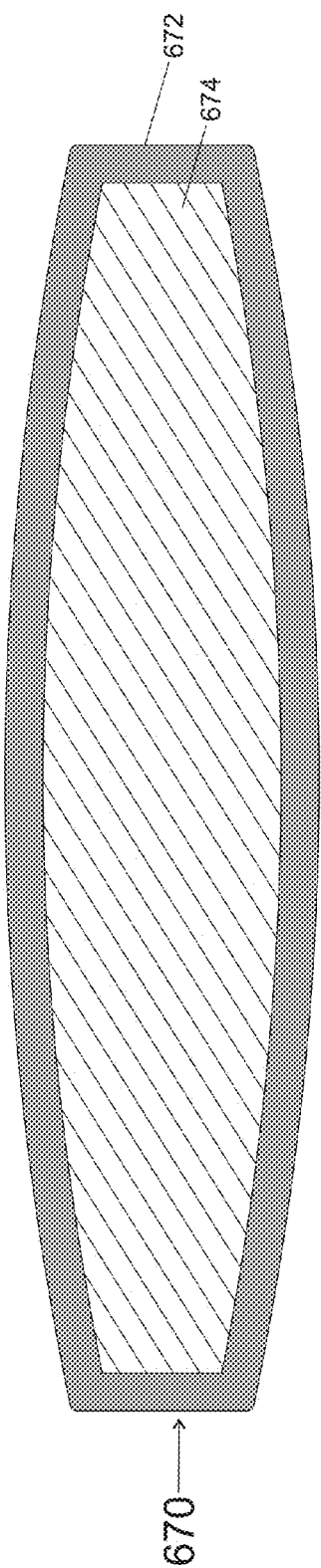
FIG.6G
FIG.6H

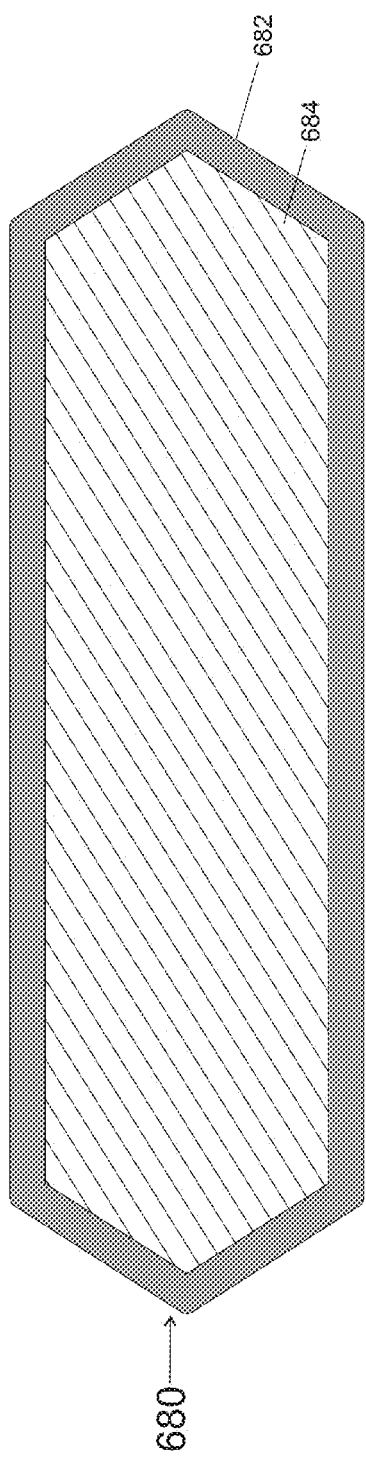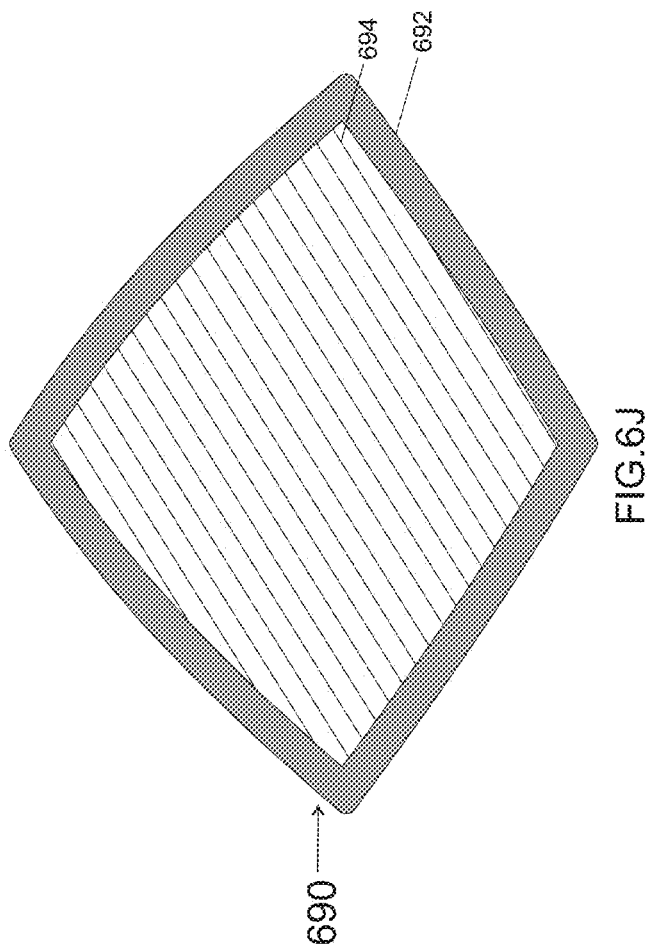
FIG.6I
FIG.6J

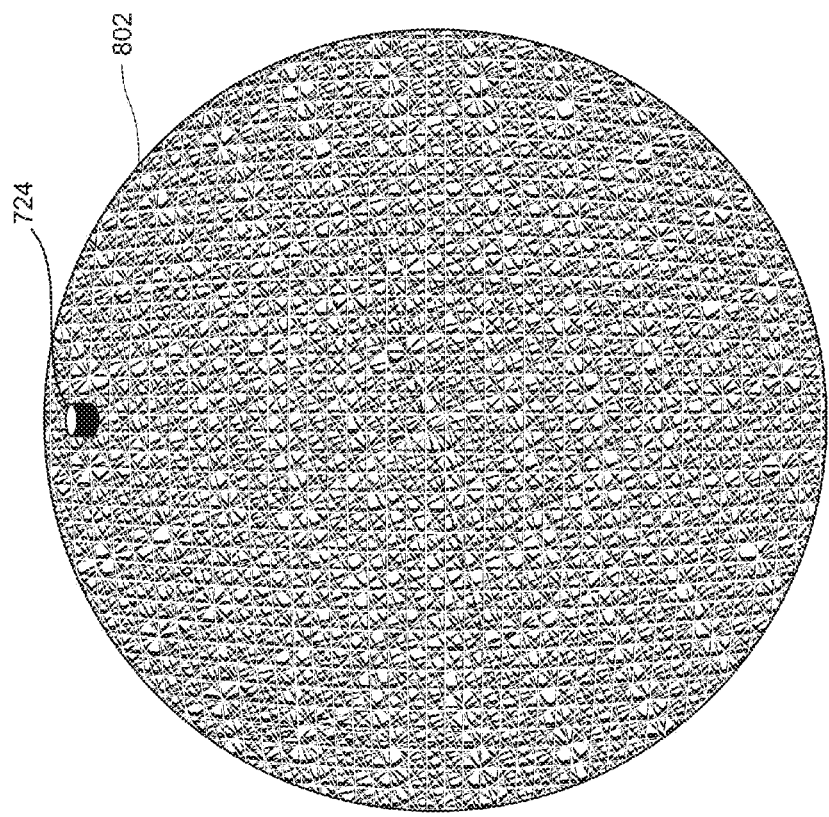
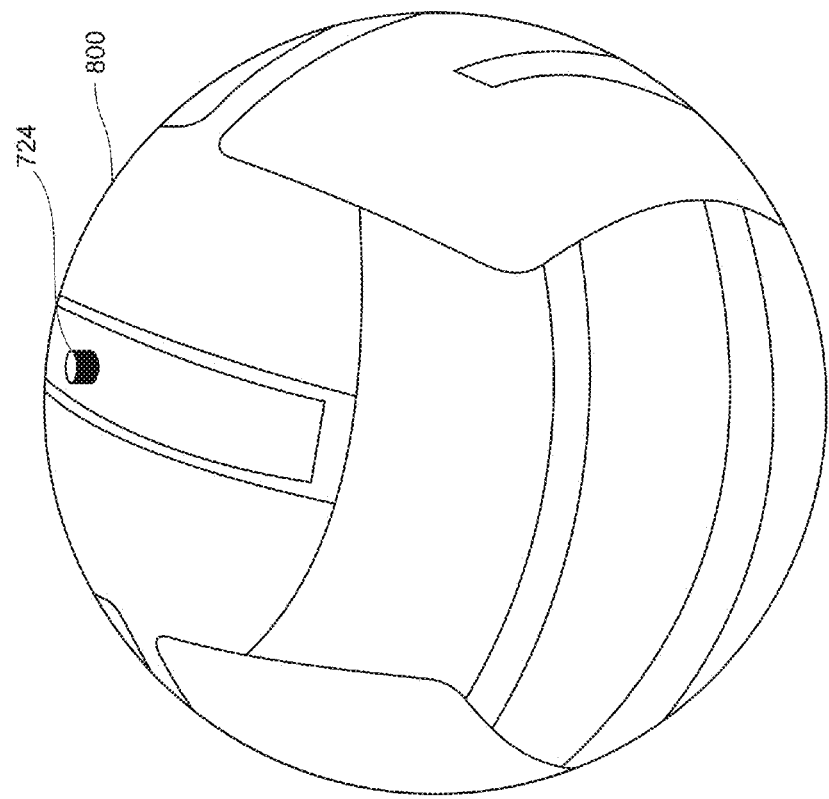

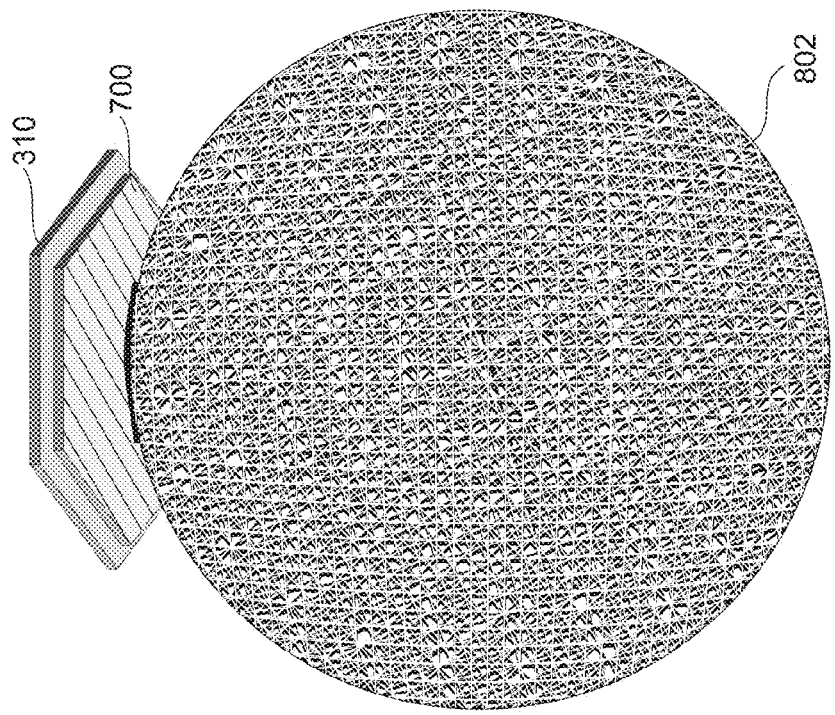
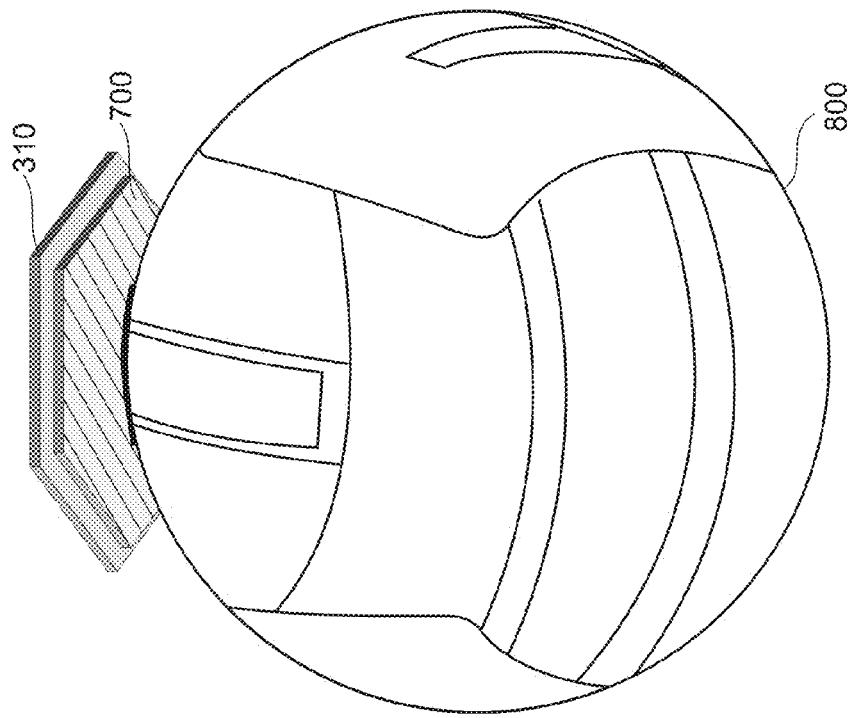

SYSTEMS AND METHODS FOR PRODUCING A BALL

PRIORITY

This application claims the benefit of priority from Pakistan Patent Application No. 759/2013, filed Nov. 4, 2013, which is hereby incorporated herein by reference in its entirety.

TECHNICAL FIELD

The present disclosure relates generally to a ball and a method for manufacturing a ball. More particularly, and without limitation, the present disclosure relates to structures and methods for manufacturing a sports ball.

BACKGROUND

Conventional hand stitched and thermo bonded soccer balls have numerous drawbacks related to costs and performance. For example, the labor for hand-stitching balls is expensive since manufacturing a hand-stitched soccer ball may take four to six weeks. These balls also use a large amount of materials including three or more layers of cloth and a large amount of latex adhesive. Additionally, in hand stitched balls, the stitches are exposed on the surface of the ball. The exposure of the stitches on the surface leads to quicker abrasion of a manufactured ball.

On the other hand, thermo bonded soccer balls do not contain stitches that may be exposed on the outer surface, thermo bonded soccer balls have high transportation costs associated with them since they may not be deflated. For example, 7500 deflated soccer balls may be packed in a twenty foot container, while only 2,500-3000 thermo bonded soccer balls may be transported in the same container-leading to significantly higher transportation costs. Exemplary embodiments, consistent with the present disclosure, therefore aim to resolve the aforementioned problems, among others.

SUMMARY

An object of the invention is to provide a new and improved soccer ball having a high performance, synthetic leather stitched cover that exhibits softness while maintaining durability.

In an exemplary embodiment, a soccer ball includes a bladder and a plurality of panels stitched together, all but one of the plurality of panels consisting of outer layer cutouts that are attached to inner layer cutouts using adhesive. The outer layer cutouts consist of at least a fabric, adhesives, and an EPDM foam. The inner layer cutouts consist of ethylene propylene diene monomer (EPDM) foam that is the same shape as corresponding outer sheet cutouts but of a smaller size, and the inner layer cutouts extend to stitch lines on the outer layer cutouts, a distance between edges of the other layer cutouts and the stitch lines is 2-3 mm. Furthermore, a bladder valve panel of the plurality of panels consists of an outer layer cutout attached to a bladder valve panel inside layer consisting of multiple layers of fabric and multiple layers of adhesives, and including a valve that is attached to the bladder.

In an exemplary embodiment, a manufacturing method of a soccer ball is provided. Exemplary methods include cutting outer layer cutouts from an outer layer for two or more panels, the outer layer consisting at least of a fabric, ethylene propylene diene monomer (EPDM) foam, cutting inner layer cutouts for the two or more panels from an inner layer consisting of EPDM foam, adhesive, and a plastic sheet, the inner layer cutouts being the same shape as corresponding outer sheet cutouts but of a smaller size, and cutting a bladder valve panel inside layer from a sheet consisting of multiple layers of fabric, multiple layers of adhesives, and a plastic sheet, the bladder valve panel inside layer of the same size and shape as the inner layer cutouts. The method further includes forming a bladder valve panel by applying an adhesive to an exposed surface of one of the outer layer cutouts and removing the plastic sheet to expose an adhesive layer from the bladder valve panel inside layer and attaching the remaining multiple layers of fabrics and multiple layers of adhesive to the exposed surface of the one of the outer layer cutouts. The method further includes attaching a bladder to the bladder valve panel and inserting a valve attached to the bladder in the middle of the bladder valve panel, determining stitch lines on each of the outer layer cutouts, the stitch lines closer to edges of each of the outer layer cutouts than edges of a corresponding inner layer cutout, stitching a plurality of the outer layer cutouts together using machine stitching at the stitch lines, applying adhesive to exposed surfaces of all remaining outer sheet cutouts other than the cutout used in the bladder valve panel, removing the plastic sheets of the inner sheet cutouts to expose respective adhesive layers of each of the inner sheet cutouts and attaching the respective EPDM foams to the exposed surfaces of all remaining outer sheet cutouts, and inverting the soccer ball inside out so that the bladder is contained within the soccer ball. The method further includes hand stitching any remaining unstitched stitch lines and inserting air in the bladder and applying heat to the soccer ball in a ball molding device to compress the EPDM foams to extend to the stitch lines.

BRIEF DESCRIPTION OF THE DRAWINGS

The accompanying drawings, which are incorporated in and constitute a part of this specification, illustrate exemplary embodiments of the present disclosure and, together with the description, serve to explain the principles of the disclosure.

FIG. 1 shows a cross-section of materials comprising an outer layer of padding of a soccer ball, consistent with exemplary embodiments of the present disclosure;

FIG. 2 shows a cross-section of materials comprising an inner layer of padding of a soccer ball, consistent with exemplary embodiments of the present disclosure;

FIGS. 3A and 3B are illustrations of an exemplary scenario for cutting out panel shapes, consistent with exemplary embodiments of the present disclosure;

FIGS. 4A-D illustrate an exemplary scenario for stitching two panels together, consistent with exemplary embodiments of the present disclosure;

FIGS. 5A-C are different views of a panel with outer layer and inner layer attached to each other, consistent with exemplary embodiments of the present disclosure;

FIGS. 6A-6J illustrate various shapes of panels, consistent with exemplary embodiments of the present disclosure;

FIGS. 8A and 8B illustrate exemplary bladders, consistent with exemplary embodiments of the present disclosure;

FIGS. 9A and 9B illustrate exemplary bladders attached to respective bladder valve panels, consistent with exemplary embodiments of the present disclosure.

DETAILED DESCRIPTION

Figure 4A:
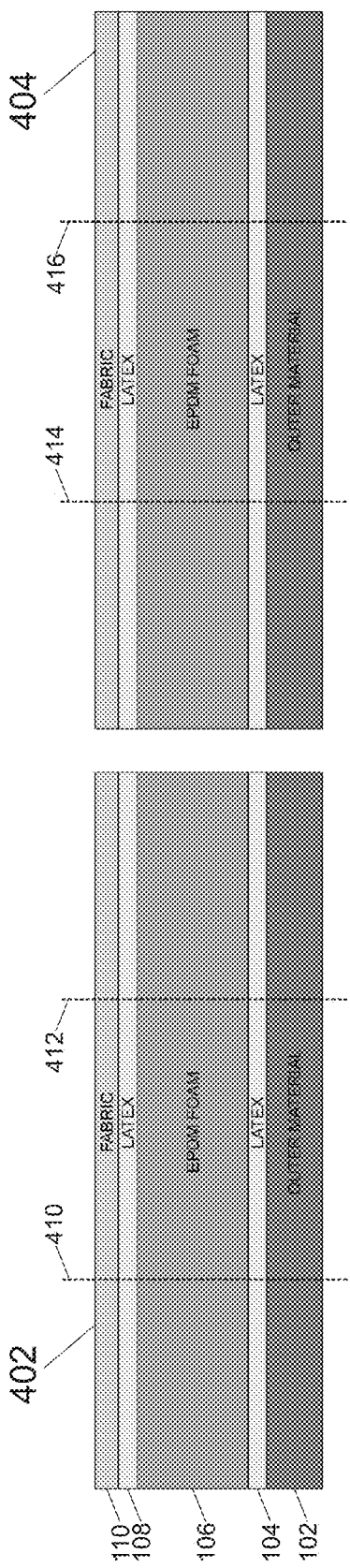

A soccer ball is made up of two major components, a bladder and a cover of panels. Embodiments consistent with the present disclosure enhance the performance of a soccer ball by providing a method and structure for efficient stitching of panels and providing these panels with a reinforced support using foam. Specifically, exemplary embodiments provide for stitching together cutouts of an outer layer of a padding, and then attaching foam of a similar shape but a smaller size to each of the cutouts. When an air bladder included within a soccer ball is filled and molding is applied to the soccer ball, the attached foams are compressed and expand to stitch lines of the cutouts of the outer layer, creating a reinforced panel support system. The reinforced panel and molding of a soccer ball allows for uniformity and consistency in the shape of a soccer ball. Accordingly, soccer balls that are manufactured by using exemplary methods may have better performance and outer appearance than hand-stitched and thermo bonded balls. By creating a reinforcing padding system using exemplary methods, a mostly machined stitched soccer ball may have the appearance and performance characteristics of a thermo bonded ball while at the same time the ability to be deflated similar to a hand-stitched ball.

FIG. 1 shows a cross-section of materials comprising an outer layer 100 for panels of a soccer ball, consistent with exemplary embodiments of the present disclosure. Outer layer 100 may include an outer material sheet 102 which may be a layer of Polyvinyl Chloride (PVC), Polyurethane (PU), or a similar synthetic material. Outer material sheet 102 may be laminated to a first layer of ethylene propylene diene monomer (EPDM) compound foam 106. In embodiments, outer material sheet 102 may have a thickness of 0.3-2.0 mm and foam 106 may have a thickness of 2-3 mm The lamination may be completed using an adhesive 104, such as a latex adhesive. A thin layer of cloth or fabric 110 may then be attached on back of foam 106, using another layer of adhesive 108, such as a latex adhesive. In embodiments, fabric 110 may have a thickness of 0.3-1.0 mm. In embodiments, outer layer 100 may be heated and dried for a pre-determined period. For example, outer layer 100 may be dried at 55 degrees Celsius for up to one hour. In embodiments, total thickness of outer layer 100 may be 4.6-6 mm.

FIG. 2 shows a cross-section of materials comprising an inner layer 200 for panels of a soccer ball, according to an embodiment of the present disclosure. Inner layer 200 may include EPDM compound foam 206. In embodiments, EPDM foam 206 may have a thickness of 2-3 mm. In additional embodiments, a thickness of EPDM foam 206 may be dependent on the texture of the material and its ability to expand under compression. For example, as will be apparent later, foam 206 may need to expand a certain distance when compression is applied, therefore a particular thickness will be needed for foam 246 to expand a certain distance when a particular amount of pressure and/or heat is applied. Foam 206 may be laminated to plastic sheet 202 using adhesive layer 204, such as a latex adhesive. In embodiments, as explained below in further detail, removing the plastic sheet will allow the EPDM foam 206 to be attached to outer layer 100. In embodiments, plastic sheet 202 may be polyethylene or polypropylene. In embodiments, total thickness of inner layer 200 may be 0.45-0.55 mm.

FIGS. 3A and 3B are illustrations of an exemplary scenario for cutting out panel shapes, according to an embodiment of the present disclosure. Layer 300 may represent either inner layer 100 or outer layer 200. In an exemplary embodiment, corresponding cutouts of outer layer 100 and inner layer 200 for soccer ball panels may have the same shape but different sizes. Specifically, a cutout of inner layer 200 may be smaller is size than a cutout of outer layer 100. That is, for a hexagonal panel, a hexagonal cut out from outer layer 100 may be cut and a corresponding smaller hexagonal cut out from inner layer 200 may be cut. As shown in FIG. 3A, required panel shapes (304, 306, and 308) may be cut from layer 300 using conventional ball cutting knives. FIG. 3B illustrates an exemplary cutout 310 that may be cut from layer 300. In this exemplary scenario, cutout 310 may represent a cutout of outer layer 100. Cutout 310 is hexagon shaped to form a hexagon shaped panel.

FIG. 4A-4D are cross-sections of exemplary steps in the forming of panels of a soccer ball, consistent with embodiments of the present disclosure. One of ordinary skill in the art will comprehend, that the elements illustrated within FIGS. 4A-4D are not drawn to scale. Instead, they have been illustrated in sizes that allow for easier comprehension.

FIG. 4A illustrates two cutouts 402 and 404 side-by-side. In an exemplary embodiment, cutouts 402 and 404 may be cutouts from outer layer 100. Accordingly, cutouts 402 and 404 may be respective cutouts of respective layers of fabric 110, adhesive 108, foam 106, adhesive 104, and outer material 102. Stitch lines 410, 412, 414, and 416 may represent locations on cutouts 402 and 404 where stitching may be applied. Each cutout of outer layer 100 may contain stitch lines similar to stitch lines 410, 412, 414, 416 illustrated on cutouts 402 and 404. In an exemplary embodiment, the stitch lines may be a pre-determined distance from the edges of cut outs of outer layer 100. Further details regarding stitch lines is provided along with description accompanying FIGS. 5A-C.

Figure 4B:
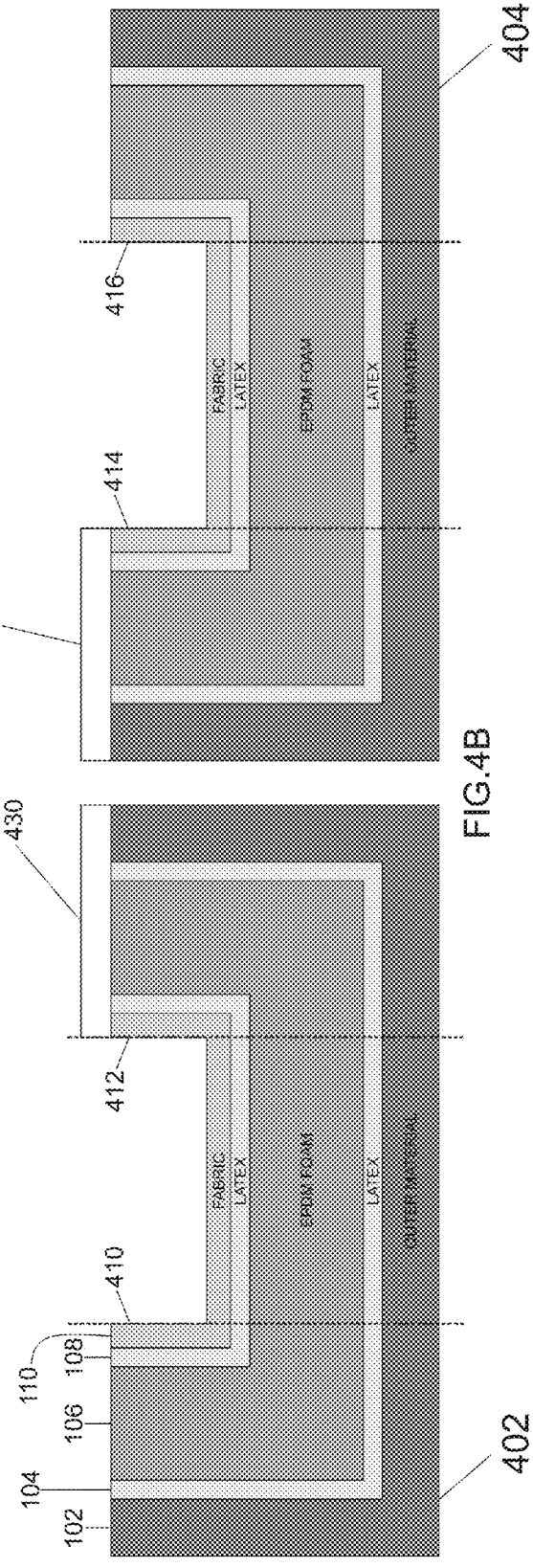

FIG. 4B illustrates stitch regions 430 and 432 of the two cutouts 402 and 404 turned up. Stitch regions may refer to regions from respective stitch lines to respective edges of cutouts of the outer layer 100. For example, from stitch lines 410, 412, 414, and 416 to edges of cutouts 402 and 404. In embodiments, an aspect of the step illustrated in FIG. 4B is that the stitch regions of two cutouts are placed next to each other for stitching so that they may be stitched together at stitch lines 412 and 414. In embodiments, two respective cut outs necessarily do not need to be flat side-by-side, rather, in a position where two cutouts may be stitched together at stitch lines. In embodiments, an aspect of the step illustrated in FIG. 4B-4D is that the stitching is applied at respective stitch lines 412 and 414 with surfaces of the respective outer material 102 being in contact with each other. Accordingly, after all panels are stitched together, any machine stitching may be contained within a soccer ball. Additionally, fabric layers (fabric 110) may also be contained within the ball, as is apparent by the additional description provided in the disclosure.

FIG. 4C illustrates stitching 420 at stitch lines 412 and 414 that stitches together cutouts 402 and 404. Stitching 420 may be applied to all stitch lines of a cutout for a first panel with cutouts for various other panels. For example, a hexagonal shaped cutout may be stitched together with six other cutouts, each of the six cutouts forming parts of six respective panels of a soccer ball. In embodiments, stitching material may be high strength polyester, or polyester cotton mix high strength applied by a stitching machine, such as a high tension stitching machine. A high tension stitching machine may apply very high tension on a thread enabling the stitches to be invisible on the outer shell of a manufactured soccer ball.

FIG. 4D illustrates application of cutouts of inner layer 200 to stitched together cutouts 402 and 404, according to exemplary embodiments consistent with the present disclosure. In this exemplary scenario, foam 206 and adhesive 204 may be respective layer cutouts of inner layer 200. First, adhesive 422, such as a latex adhesive, may be applied on the exposed surface of fabric 110 that is not part of the stitch region. Adhesive 422 may be hand-applied or applied automatically by machines. Then, a cutout of plastic sheet 202 may be peeled off from adhesive 204, exposing adhesive 204, which may be a latex adhesive. Therefore, adhesives 422 and 204 may be used for attaching foam 204 to fabric 110. In embodiments, there may be a gap between stitching 420 (that is, stitching lines 410 and 412) and foam 206. As described later, application of compression and/or heat to foam 206 may lead the foam 206 to extend to stitching 420, at respective stitch lines of various panels.

In embodiments, only one of adhesives 204 and 422 may be used for attaching foam 206 to fabric 110. For example, a cutout of foam 206 may be attached directly to fabric 206 using only adhesive 422. However, an aspect of exemplary embodiments is that the width of foam 426 is less than any stitch lines on a cutout of outer layer 100.

Figure 5C:
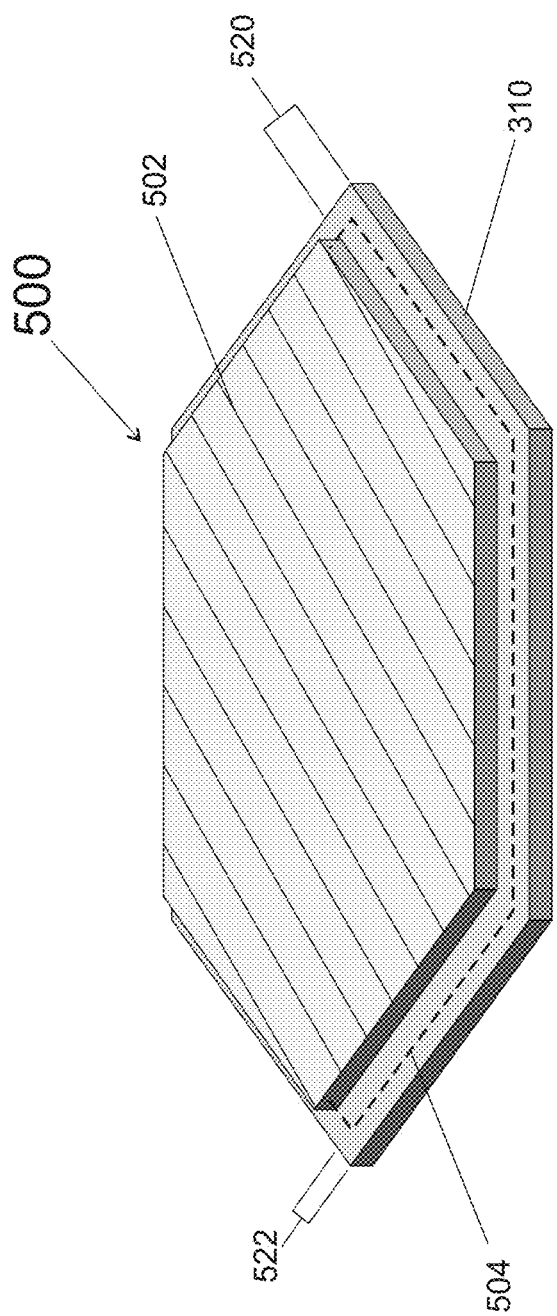

FIG. 5A-5C are different views of a panel with cutouts of an outer layer and an inner layer attached to each other, according to an embodiment of the present disclosure. Exemplary panel 500 illustrates a singular panel as it may appear after the steps illustrated in FIGS. 4A-D have been applied. FIGS. 5A-5C illustrate the difference in size between cutouts of outer layer 100 and inner layer 200. For example, FIG. 5A illustrates a top view of cutout 310 attached to cutout 502 (which may be a cut out of inner layer 200). Both cutout 310 and cutout 502 are of similar shape, but cutout 502 is smaller in size. As discussed above, after cutting out cutout 502 from inner layer 200, plastic sheet 202 is removed. Thereafter, using adhesive layer 204, EPDF foam 206 may be attached to cutout 310. Stitch line 504 may represent where stitching may be applied to attach panel 500 to other panels.

As illustrated in a cross-section of panel 500 illustrated in FIG. 5B, a distance 520 between the edge of cutout 502 and cutout 310 may be 4-10 mm. Additionally, distance 522 between stitch line 504 and edge of cutout 310 may be 2-4 mm. As discussed above, and explained in further detail below, the gap/cavity between cutout 502 and stitch line 504 may be covered due to the application of pressure on cutout 502 which may comprise of EPDM foam. The gap/cavity between cutout 502 and stitch line 504 may be of 2-6 mm. In some embodiments, the gap/cavity between cutout 502 and stitch line 504 may a function of the thickness of EPDM foam in cutout 502 or the properties of EPDM foam to expand by application of pressure and/or compression. In embodiments, distance 522 may be equal to or more than two-thirds of a distance than distance 520.

FIG. 5C, illustrates a three-dimensional view of panel 500. In embodiments, the three-dimensional view of panel 500 provides a further perspective indicating the size difference between cutout 310 and cutout 502, in addition to the placement of stitch line 504.

Figure 6A:
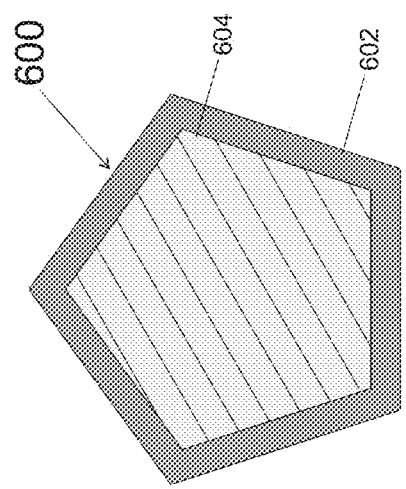
Figure 6C:
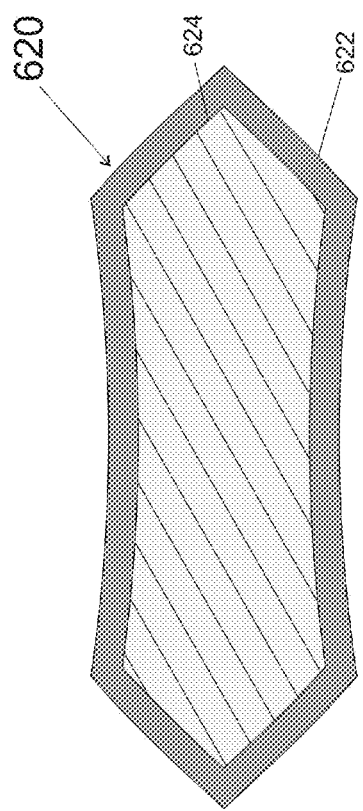
Figure 6B:
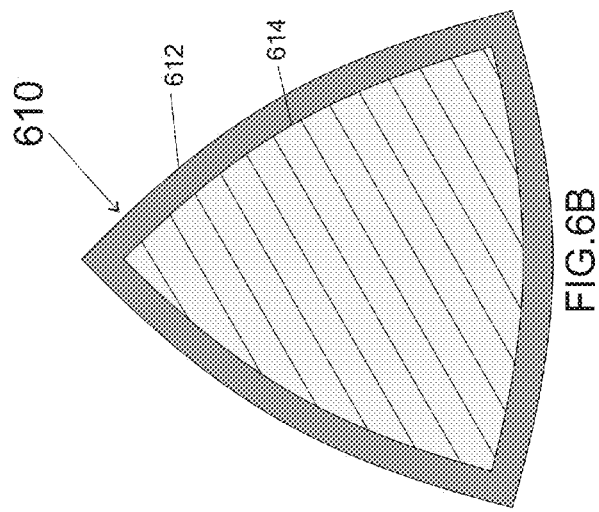

FIGS. 6A-6J illustrate various shapes of panels, consistent with exemplary embodiments of the present disclosure. FIG. 6A illustrates pentagon-shaped panel 600 comprising outer layer cutout 602 attached to inner layer cutout 604. Similarly, FIGS. 6B-6J, illustrate different shaped panels 610, 620, 630, 640, 650, 660, 670, 680, and 690, that each include respective outer layer cutouts 612, 622, 632, 642, 652, 662, 672, 682, 692, and corresponding respective inner layer cutouts 614, 624, 634, 644, 654, 664, 674, 684, and 694.

In embodiments, different shaped panels may be stitched to each other. For example, round-shaped panel 650 may be stitched panel 640. However, for each panel of a soccer ball, a size of a cutout of inner layer 200 may be less than a cutout of outer layer 100.

Figure 7A:
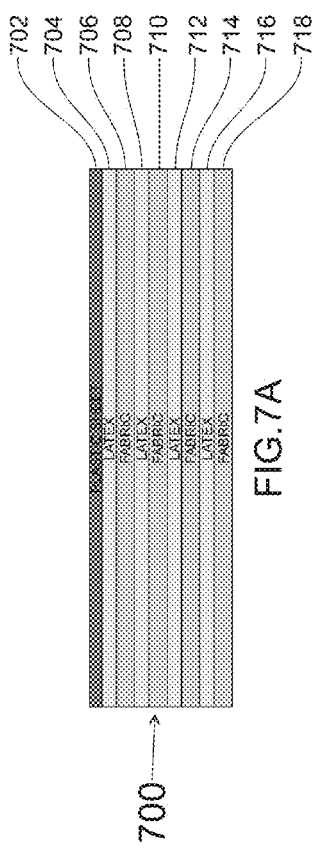
FIGS. 7A and 7B illustrate exemplary steps for creating a bladder valve panel, consistent with exemplary embodiments of the present disclosure.
Figure 7B:
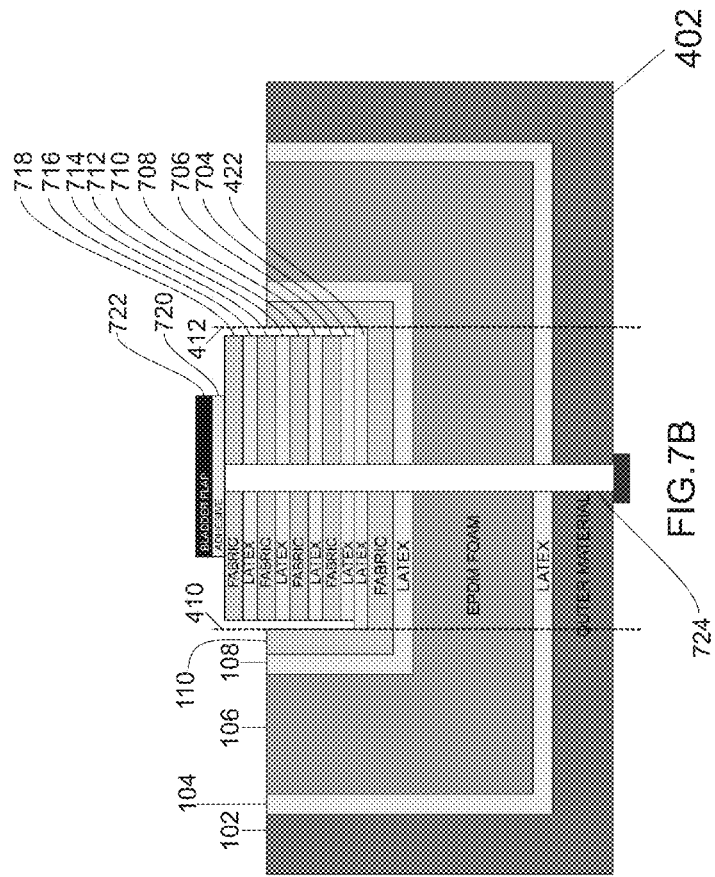

FIGS. 7A and 7B illustrate exemplary steps for creating a bladder valve panel, consistent with exemplary embodiments of the present disclosure. A bladder valve panel may refer to a panel of a soccer ball that has a bladder attached to it and contains a valve for filling air into the bladder or for deflating the bladder. For example, FIG. 7A, illustrates another a cutout of bladder valve panel inside layer 700, consistent with exemplary embodiments of the present disclosure. In embodiments, a cutout of bladder valve panel inside layer 700 is a cutout of a similar shape as a cutout of inner layer 200 corresponding to a cutout of outer layer 100. Accordingly, bladder valve panel inside layer 700 may be attached to cutout 310 of outer layer 100 to form a bladder valve panel. In detail, inner layer 700 consists of four layers of fabric 706, 710, 714, 718, laminated together with adhesives 708, 712, and 716. Plastic sheet 702, similar to plastic sheet 202, may be attached to fabric 706 using adhesive 704. Adhesives 704, 708, 712, and 716, may be a latex adhesive. In exemplary embodiments, additional or lesser layers of fabric may be used interspersed with adhesives with a thickness equivalent to or similar to thickness of EPDM foam 206. Using inner layer 700 to attach to cutout 310 for forming a valve panel allows for preventing bumps on a soccer ball that may be caused if EPDM foam 206 is used as part of the bladder valve panel. Therefore, exemplary methods allowing for using the bladder valve panel along with other panels allows for overall uniformity, balance, and precision in a soccer ball.

FIG. 7B illustrates application of a cutout of bladder valve panel inside layer 700 to cutout 402, according to exemplary embodiments consistent with the present disclosure. In this exemplary scenario, first, adhesive 422, such as a latex adhesive, may be applied on the exposed surface of fabric 410 that is not part of any stitch region, that is, internal to stitch lines 410 and 412. Then, plastic sheet 702 may be peeled off from adhesive 704, exposing adhesive 704, which may be a latex adhesive. Therefore, adhesives 704 and 422 may be used for attaching foam 424 to fabric 706. Additionally, a cavity may be created in the middle of the bladder valve panel where valve 724 may be inserted. Valve 724 may be attached to bladder flap 722. As explained in further detail along with the explanation of FIGS. 8A and 8B, bladder flap 722 may refer to a portion of an exemplary bladder that may be attached to a bladder valve panel. Adhesive 720 may be applied between bladder flap 722 and fabric layer 718 attaching bladder flap 722 to the bladder valve panel.

In embodiments, a bladder valve panel may be created by inserting valve 724 attached to bladder 724 in a panel created using the exemplary method illustrated in FIGS. 4A-D and FIGS. 5A-C.

FIGS. 8A and 8B illustrate two exemplary bladders 800 and 802, consistent with exemplary embodiments of the present disclosure. Bladders 800 and 802 are both attached to exemplary valve 724. In embodiments, adhesive may be applied to portions of bladders 800 and 802 (bladder flap 722) surrounding valve 724 so that bladders 800 and 802 may be permanently attached to a bladder valve panel. Bladder 800 may be any molded rubber or butyl or synthetic rubber that may be wound with polyester or nylon threads. Bladder 802 may be a molded rubber or butyl bladder or synthetic rubber that may be laminated with polyester or polyester cotton cloth strips. In embodiments, additional bladders, with restricted circumference properties may be used. In exemplary embodiments, valve 724 may be used for inflating or deflating bladders 800 and 802. Exemplary bladders aid in providing firmness and roundness to a soccer ball. FIGS. 9A and 9B illustrate the two exemplary bladders 800 and 802, attached to respective bladder valve panels (consisting of cutout 310 of outer layer 100 and a cutout of bladder valve panel inside layer 700 which has the same dimensions as a cutout of inner layer 200). An exemplary bladder valve panel may be stitched together with additional panels formed using the method illustrated in FIGS. 4A-D and 5A-C to form a soccer ball.

In exemplary embodiments, most of the cutouts of outer layer 100 for the panels are machine-stitched together, with the fabric layers 110 being exposed on the outside of the soccer ball when machine stitching is being applied. Then, after cutouts of inner layer 100 are attached, the ball may be inverted inside out, where the bladder is contained within the soccer ball. Hand stitching may then be applied to any remaining un-stitched panel edges. In embodiments, only an amount of panels edges are left for hand stitching that are needed to invert a soccer ball inside out so that the bladder is contained within the stitched-together panels. In embodiments, a length of panel edges where hand-stitching may be applied is four to six inches.

Figure 10B:
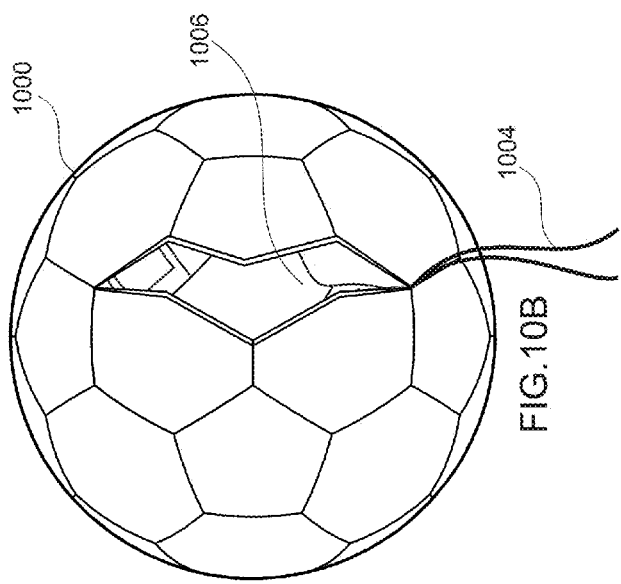
FIGS. 10A-C illustrate some exemplary steps for stitching panels of a soccer ball, consistent with exemplary embodiments of the present disclosure.
Figure 10C:
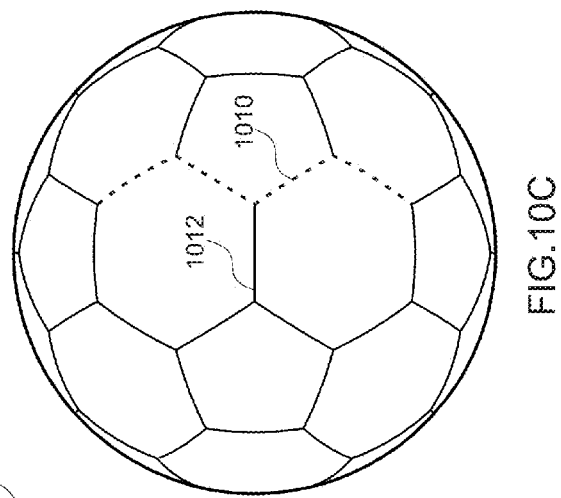
Figure 10A:
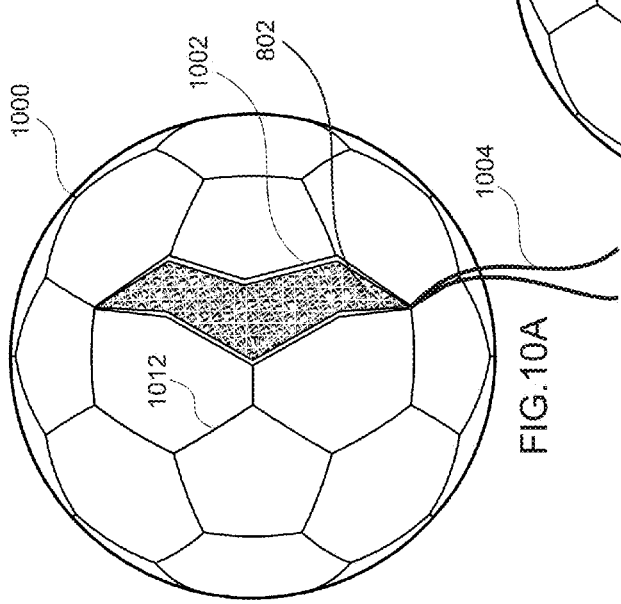

FIGS. 10A-C illustrate some exemplary steps for stitching panels of a soccer ball, consistent with exemplary embodiments of the present disclosure. FIG. 10A illustrates soccer ball 1000 with various panels. Numerous panels and/or panel edges of soccer ball 1000 are stitched together using machine stitching 1012 as discussed above with respect to FIGS. 4A-4D. A cavity 1002 exposing bladder 802 may be hand-stitched using string 1004. FIG. 10B illustrates a second stage of hand stitching where panels are pulled closer together and string 1004 may be being applied at exemplary position 1006. FIG. 10C illustrates a completed stitched soccer ball 1000 with majority of the panels and/or panel edges being stitched together by applying machine stitching 1012. Four panel edges are stitched together using hand stitching 1010.

In embodiments, once the machine and hand stitching is complete, a bladder contained within a soccer ball may be completely filled with air. Then, the soccer ball may be placed in a heated molding machine which is round in the finalized shape of a soccer ball. Heating under pressure of the inner cover of a molding machine may then be applied to the soccer ball for providing a permanent shape to the soccer ball. In some embodiments, the soccer ball may be molded at 70 degrees Celsius for thirty seconds to sixty seconds. Accordingly, a total of sixty second of heat of 70 degrees Celsius may be applied to the soccer ball. In embodiments, EPDM foam contained on the inside of each panel may be moldable at 60 degrees Celsius to 80 degrees Celsius. Therefore, the ball sets uniformly from outside through the pressure generated owing to the hot mold and inside due to the pressure from the bladder. In embodiments, any space left between EPDM foam padding and stitch lines are filled because of the pressure applied by the bladder and the molding. Therefore, the moldable property of EPDM foam may allow for creation of a uniform surface on the inside of the ball as well as the molding providing a uniform surface on the outside of the football. In embodiments, the exemplary manufacturing methods provide for a robust soccer ball where the EPDM foam provides a foam support structure surrounding the bladder and reinforcing the outside cover.

In embodiments, any seams in a ball may be sealed by application of sealants before or after molding. Exemplary sealants may include polyurethane liquids among others.

In embodiments, exemplary soccer balls manufactured according to exemplary methods aid in reducing manufacturing costs significantly, while at the same time, the ball rebounds, has water resistance/absorption, and has abrasion properties that are superior to the characteristics of current hand stitched and thermo bonded balls. Furthermore, the ability to transport these balls while they are deflated also leads to numerous commercial advantages such as significant reduction of cost compared to transportation of thermo bonded balls.

In some embodiments, the exemplary methods of stitching together panels with foam support may be applied in any types of balls that utilize panels and bladders, such as footballs, rugby balls, volleyballs, water polo balls, handballs etc.

What is claimed:

1. A manufacturing method of a soccer ball, comprising the steps of:
    a. cutting outer layer cutouts from an outer layer for a plurality of panels, the outer layer comprising a fabric and ethylene propylene diene monomer (EPDM) foam,
    b. cutting inner layer cutouts for all but one of the plurality of panels from an inner layer comprising EPDM foam, adhesive, and a plastic sheet, the inner layer cutouts being the same shape as corresponding outer layer cutouts but of a smaller size;
    c. cutting a bladder valve panel inside layer cutout from a sheet comprising multiple layers of fabric, multiple layers of adhesives, and a plastic sheet, the bladder valve panel inside layer cutout of the same size and shape as the inner layer cutouts;
    d. forming a bladder valve panel by:
        i. applying an adhesive to an exposed surface of one of the outer layer cutouts; and
        ii. removing the plastic sheet of the bladder valve panel inside layer cutout to expose an adhesive layer and attaching the remaining multiple layers of fabrics and multiple layers of adhesives to the exposed surface of the one of the outer layer cutouts;
    e. attaching a bladder to the bladder valve panel and inserting a valve attached to the bladder in the middle of the bladder valve panel;
    f. determining stitch lines on each of the outer layer cutouts, the stitch lines at a distance from edges of each of the outer layer cutouts that is less than the size difference between corresponding inner layer cutouts and outer layer cutouts;
    g. stitching a plurality of the outer layer cutouts together using machine stitching at the stitch lines;
    h. applying adhesive to exposed surfaces of all remaining outer layer cutouts other than the one of the outer layer cutouts used in the bladder valve panel;
    i. removing respective plastic sheets of the inner layer cutouts to expose respective adhesive layers of each of the inner layer cutouts and attaching respective EPDM foams to the exposed surfaces of all remaining outer layer cutouts;
    j. inverting the soccer ball inside out so that the bladder is contained within the soccer ball;
    k. hand stitching any remaining unstitched stitch lines; and
    l. inserting air in the bladder and applying heat to the soccer ball in a ball molding device for compressing the respective EPDM foams of the inner layer cutouts to extend to the stitch lines.

2. The method of claim 1, wherein determining stitch lines on each of the outer layer cutouts comprises determining that a location of the stitch lines is closer to the edges of each of the outer layer cutouts than edges of corresponding inner layer cutouts once they are attached.

3. The method of claim 1, wherein determining stitch lines on each of the outer layer cutouts comprises determining that a distance between edges of the other layer cutouts and the stitch lines is 2-4 mm and a distance between the edges of the other outer layer cutouts and edges of any attached respective EPDM foams before compression is applied is 2-6 mm.

4. The method of claim 1, wherein after step i, the stitch lines are 2-6 mm from edges of respective EPDM foams.

5. The method of claim 1, wherein a thickness of the bladder valve panel is equal to a combined thickness of the outer layer and the inside layer.

6. The method of claim 1, wherein the exposed surfaces of all remaining outer layer cutouts are fabric.

7. The method of claim 1, wherein the hand stitching is applied for four to six inches.

8. The method of claim 1, wherein the soccer ball comprises thirty-two panels.

9. A manufacturing method of a soccer ball, comprising the steps of:
   a. cutting outer layer cutouts from an outer layer for a plurality of panels,
   b. cutting inner layer cutouts for all but one of the plurality of panels from an inner layer including ethylene propylene diene monomer (EPDM) foam, the inner layer cutouts being the same shape as corresponding outer layer cutouts but of a smaller size;
   c. cutting a bladder valve panel inside layer cutout from a sheet comprising multiple layers of fabric and multiple layers of adhesives, the bladder valve panel inside layer cutout of the same size and shape as the inner layer cutouts;
   d. forming a bladder valve panel by attaching the bladder valve panel inside layer cutout to one of the outer layer cutouts;
   e. attaching a bladder to the bladder valve panel and inserting a valve attached to the bladder in the middle of the bladder valve panel;
   f. determining stitch lines on each of the outer layer cutouts, the stitch lines closer to edges of each of the outer layer cutouts than edges of a corresponding inner layer cutout that is to be attached;
   g. stitching a plurality of the outer layer cutouts together using machine stitching at the stitch lines;
   h. attaching inner layer cutouts to exposed surfaces of all remaining outer layer cutouts that are not part of the bladder panel valve;
   i. inverting the soccer ball inside out so that the bladder is contained within the soccer ball;
   j. hand stitching any remaining unstitched stitch lines; and
   k. inserting air in the bladder and applying heat to the soccer ball in a ball molding device to compress respective EPDM foams of the inner layer cutouts to extend to the stitch lines.

10. The method of claim 9, wherein the exposed surfaces of all remaining outer layer cutouts are fabrics.

11. The method of claim 9, wherein the hand stitching is applied for four to six inches.

12. The method of claim 9, wherein the soccer ball comprises of thirty-two panels.

* * * * *